(12) United States Patent
Ide et al.

(10) Patent No.: US 7,744,435 B2
(45) Date of Patent: Jun. 29, 2010

(54) OUTBOARD ENGINE SYSTEM

(75) Inventors: Shinichi Ide, Saitama (JP); Yoshiyuki Matsuda, Saitama (JP)

(73) Assignee: Honda Motor Co., Ltd., Tokyo (JP)

( * ) Notice: Subject to any disclaimer, the term of this patent is extended or adjusted under 35 U.S.C. 154(b) by 450 days.

(21) Appl. No.: 11/802,581

(22) Filed: May 23, 2007

(65) Prior Publication Data

US 2007/0283919 A1    Dec. 13, 2007

(30) Foreign Application Priority Data

May 25, 2006    (JP)    ............................. 2006-145963

(51) Int. Cl.
  B63H 20/14    (2006.01)
  B63H 23/00    (2006.01)
  B63H 20/32    (2006.01)
  B63H 21/36    (2006.01)
  B63H 21/21    (2006.01)
  B60W 10/04    (2006.01)

(52) U.S. Cl. .............................. 440/75; 440/76; 440/86

(58) Field of Classification Search .................. 440/53, 440/75, 76–78, 83, 84, 86; 74/730.1; 123/198 C; 192/3.21; 417/360, 364

See application file for complete search history.

(56) References Cited

U.S. PATENT DOCUMENTS 3,407,600 A * 10/1968 Meyer ......................... 60/337
7,458,867 B2 * 12/2008 Matsuda et al. ............... 440/75
7,503,817 B2 * 3/2009 Ide et al. ....................... 440/76
7,530,868 B2 * 5/2009 Matsuda et al. ............... 440/75

* cited by examiner

Primary Examiner—Daniel V Venne
(74) Attorney, Agent, or Firm—Arent Fox LLP (57) ABSTRACT

An outboard engine system includes: a casing coupled to a swivel case via a swivel shaft; an engine mounted in an upper part of the casing such that a crankshaft of the engine is vertically arranged and a cylinder block of the engine faces in a direction opposite to the swivel shaft; a torque converter; a vertically arranged output shaft connected to the crankshaft through the torque converter; a horizontally arranged propeller shaft provided below the output shaft; and a forward-reverse shifting gear mechanism for providing a connection between the output shaft and the propeller shaft; the torque converter, the output shaft, the propeller shaft and the forward-reverse shifting gear mechanism being disposed in the casing. The crankshaft and the torque converter which is coaxially connected to a lower end of the crankshaft are disposed above the swivel shaft; and the torque converter and the output shaft which is disposed behind the swivel shaft are connected to each other via a transmission device. Thus, it is possible to minimize a bending moment which the swivel shaft receives due to the weight of the engine and the torque converter, in the case where the torque converter is used in the outboard engine system, thereby providing an excellent steering performance.

2 Claims, 5 Drawing Sheets

OUTBOARD ENGINE SYSTEM

RELATED APPLICATION DATA

The present invention is based upon Japanese priority application No. 2006-145963, which is hereby incorporated in its entirety herein by reference.

BACKGROUND OF THE INVENTION

1. Field of the Invention

The present invention relates to an outboard engine system comprising: a casing coupled to a swivel case via a swivel shaft; an engine mounted in an upper part of the casing such that a crankshaft of the engine is vertically arranged and a cylinder block of the engine faces in a direction opposite to the swivel shaft; a torque converter; a vertically arranged output shaft connected to the crankshaft through the torque converter; a horizontally arranged propeller shaft provided below the output shaft; and a forward-reverse shifting gear mechanism for providing a connection between the output shaft and the propeller shaft; the torque converter, the output shaft, the propeller shaft and the forward-reverse shifting gear mechanism being disposed in the casing.

2. Description of the Related Art

U.S. Pat. No. 3,407,600 discloses a propulsion system for ships in which power of an engine is transmitted to a vertically arranged output shaft through a torque converter capable of torque amplification.

SUMMARY OF THE INVENTION

The present invention has an object to provide an excellent steering performance by minimizing a bending moment which a swivel shaft receives due to the weight of an engine and a torque converter, in the case where a torque converter is used in an outboard engine system comprising: a casing coupled to a swivel case via a swivel shaft; an engine mounted in an upper part of the casing such that a crankshaft of the engine is vertically arranged and a cylinder block of the engine faces in a direction opposite to the swivel shaft; a vertically arranged output shaft driven by the crankshaft; a horizontally arranged propeller shaft provided below the output shaft; and a forward-reverse shifting gear mechanism for providing a connection between the output shaft and the propeller shaft; the torque converter, the output shaft, the propeller shaft and the forward-reverse shifting gear mechanism being disposed in the casing.

In order to achieve the above object, according to a first feature of the present invention, there is provided an outboard engine system comprising: a casing coupled to a swivel case via a swivel shaft; an engine mounted in an upper part of the casing such that a crankshaft of the engine is vertically arranged and a cylinder block of the engine faces in a direction opposite to the swivel shaft; a torque converter; a vertically arranged output shaft connected to the crankshaft through the torque converter; a horizontally arranged propeller shaft provided below the output shaft; and a forward-reverse shifting gear mechanism for providing a connection between the output shaft and the propeller shaft; the torque converter, the output shaft, the propeller shaft and the forward-reverse shifting gear mechanism being disposed in the casing, wherein the crankshaft and the torque converter which is coaxially connected to a lower end of the crankshaft are disposed above the swivel shaft; and the torque converter and the output shaft which is disposed behind the swivel shaft are connected to each other via a transmission device.

With the first feature of the present invention, because the crankshaft and the torque converter are coaxially arranged above the swivel shaft, the position of the center of gravity of the engine and the torque converter gets closer to the swivel shaft, thereby reducing a bending moment acting on the swivel shaft to provide an excellent steering performance of the outboard engine system.

Further, the power of the crankshaft is transmitted to the output shaft via the transmission device without any trouble, while being subjected to the torque amplification by the torque converter.

According to a second feature of the present invention, in addition to the first feature, the engine is mounted in a mount case which constitutes a part of the casing; the transmission device is disposed close to a bottom portion of the mount case; and the bottom portion of the mount case comprises an oil reservoir which receives a lubrication oil flowing down from the engine for lubricating the transmission device.

With the second feature of the present invention, the mount case also serves as an oil reservoir for receiving oil having completed the lubrication of each portion in the engine and for lubricating the transmission device, thereby simplifying structure of the outboard engine system and improving the durability of the transmission device.

According to a third feature of the present invention, in addition to the second feature, the outboard engine system further comprises: a bulkhead member which is connected to an upper end of the mount case so as to provide a partition between the torque converter and the transmission device; and a through hole is provided in the bulkhead member so as to guide lubrication oil flowing down from the engine to the oil reservoir.

The bulkhead member corresponds to a bearing bracket 14 of an embodiment of the present invention which will be described later.

With the third feature of the present invention, the oil having completed the lubrication of the engine is guided to the oil reservoir of the transmission device without contact with an outer peripheral surface of the torque converter, thereby avoiding needless agitation and splash due to rotation of the torque converter to prevent degradation of the oil.

The above-mentioned object, other objects, characteristics, and advantages of the present invention will become apparent from a preferred embodiment, which will be described in detail below by reference to the attached drawings.

DESCRIPTION OF THE PREFERRED EMBODIMENT

Figure 1:
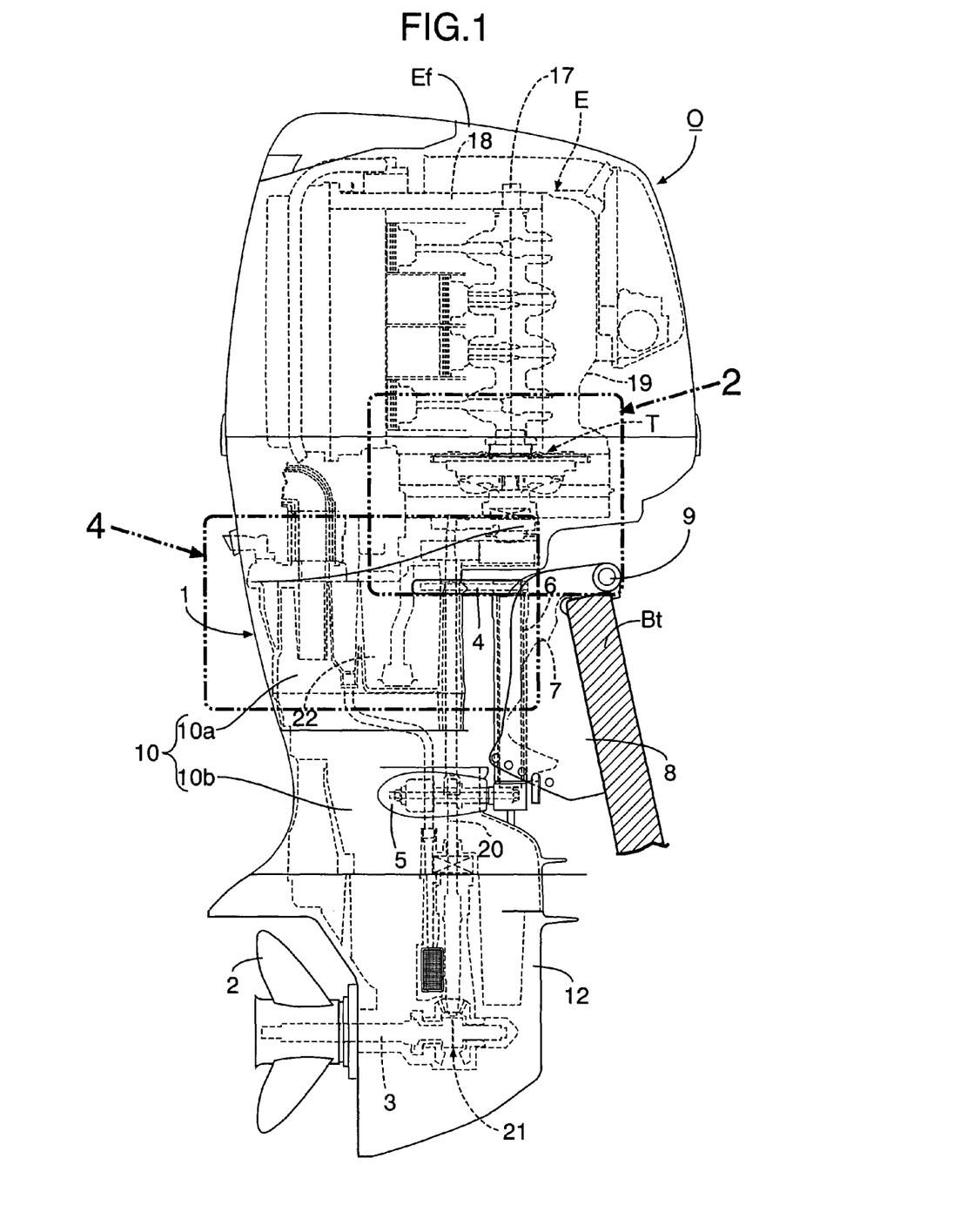
FIG. 1 is a side view showing an outboard engine system according to an embodiment of the present invention.

In FIG. 1, an outboard engine system O includes a casing 1 which has a water-cooled multi-cylinder four-stroke engine E mounted in its upper portion, and supports a propeller shaft 3 at its lower portion. The propeller shaft 3 has a propeller 2 provided at its rear end. A vertically-extending swivel shaft 6 is mounted to the casing 1 via an upper arm 4 and a lower arm 5 so as to situate in front of the casing 1. The swivel shaft 6 is rotatably supported by a swivel case 7 which is coupled to a stern bracket 8 via a horizontally-extending tilt shaft 9. The stern bracket 8 is cramped to a transom Bt of a body of a ship. Therefore, the casing 1 is horizontally rotatable around the swivel shaft 6, and vertically tiltable around the tilt shaft 9. The reference numeral Ef denotes a removable engine hood for covering the engine E.

Figure 2:
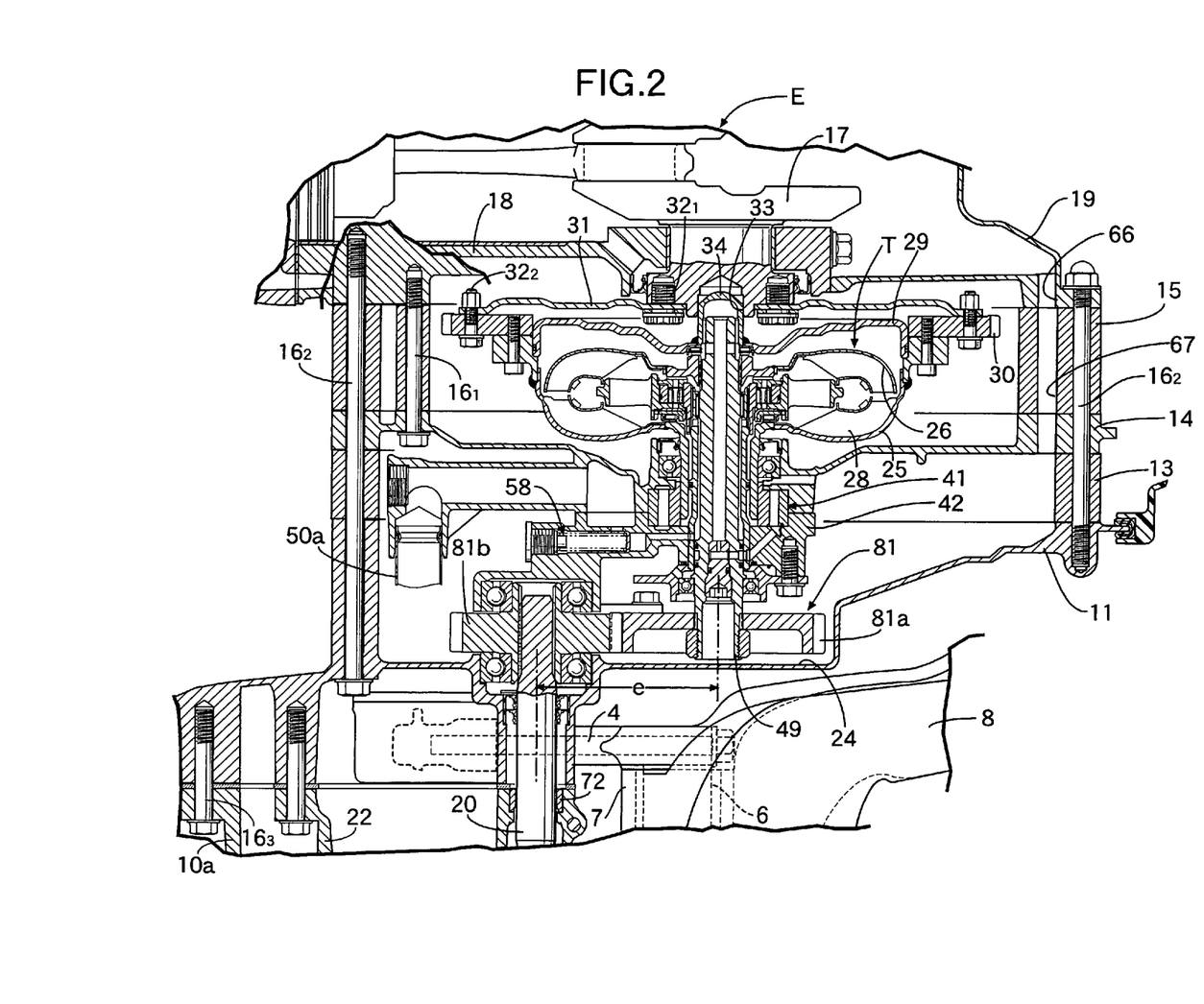
FIG. 2 is an enlarged sectional view showing the portion 2 of FIG. 1.
Figure 3:
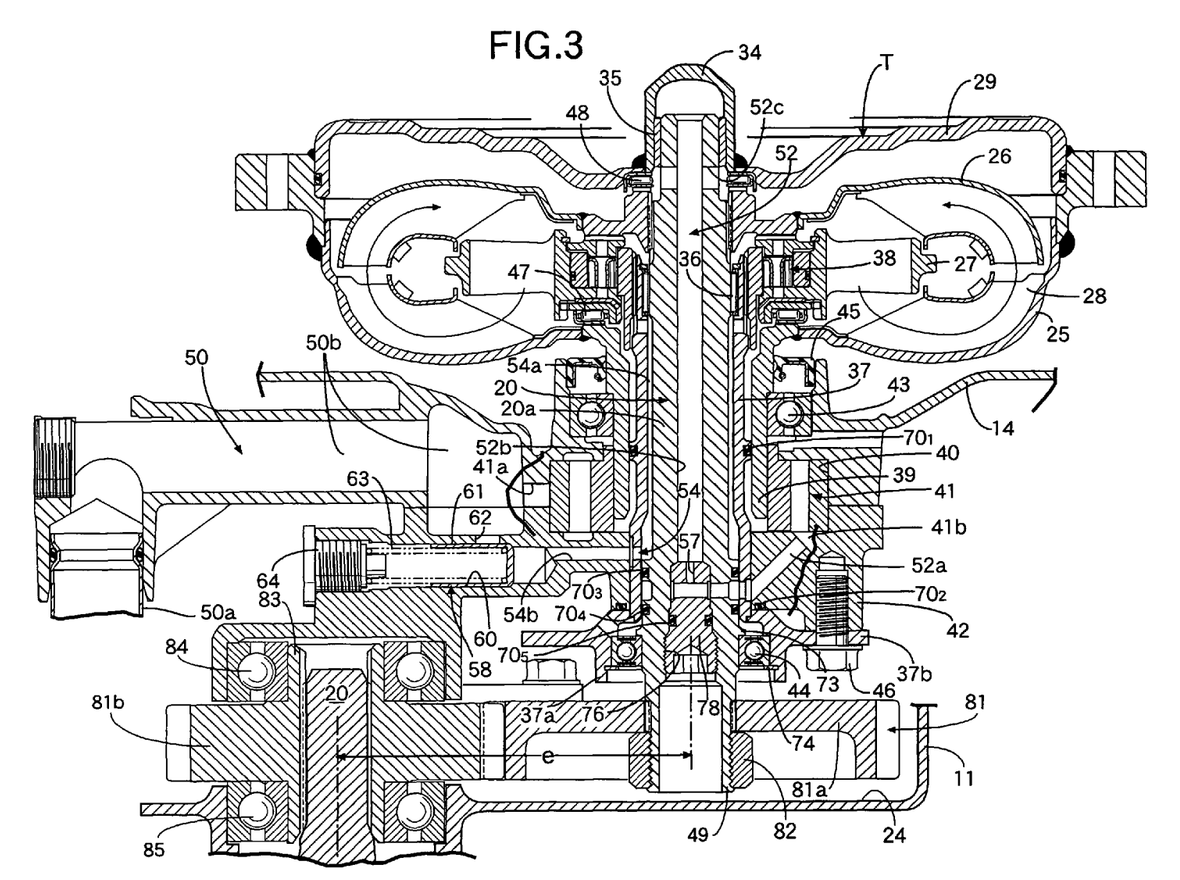
FIG. 3 is an enlarged view showing the essential portions of FIG. 2.
Figure 4:
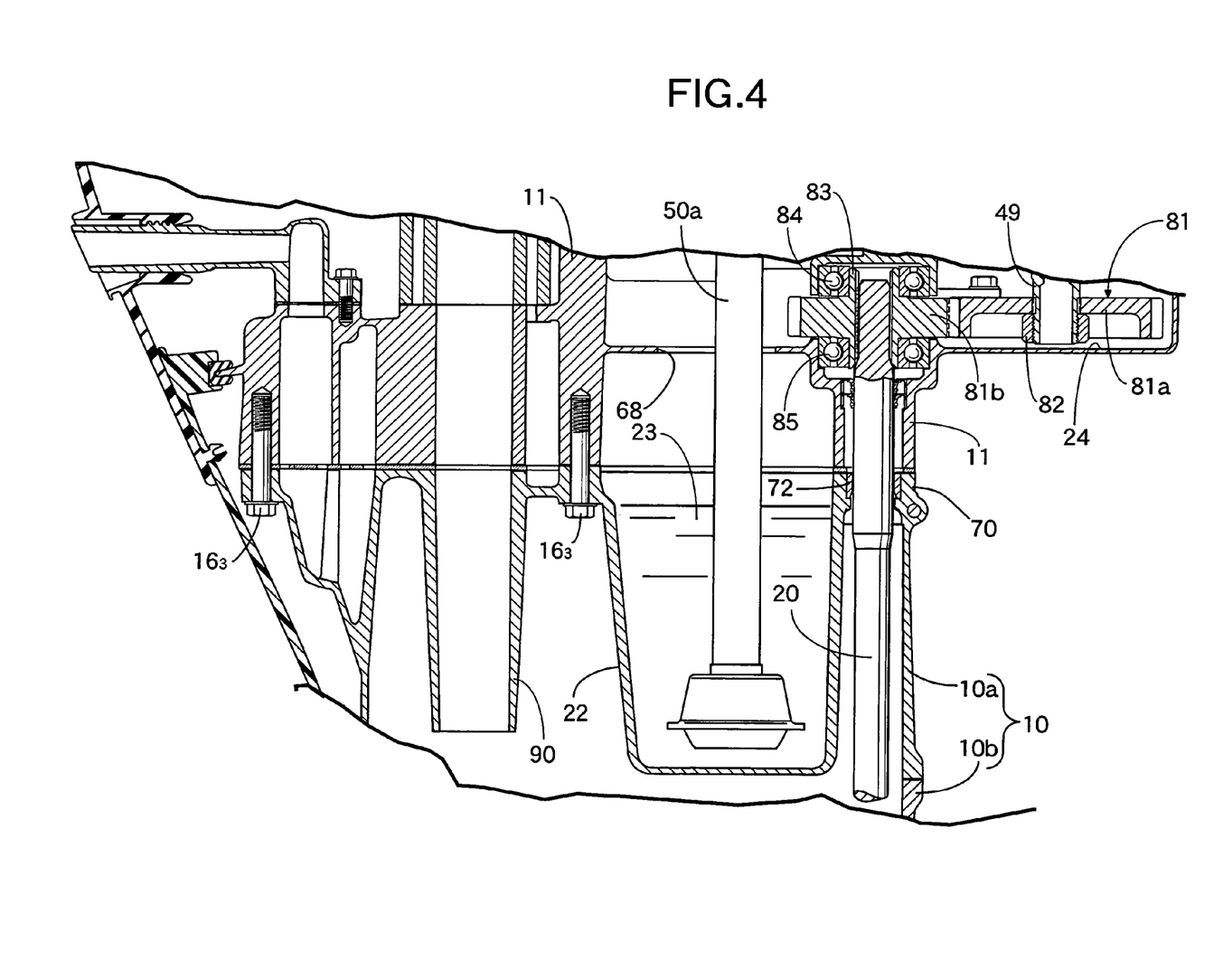
FIG. 4 is an enlarged sectional view showing the portion 4 of FIG. 1.

In FIG. 2, FIG. 3 and FIG. 4, the above casing 1 includes the extension case 10, the mount case 11 bolt-coupled to an upper end of the extension case 10, and a gear case 12 bolt-coupled to a lower end of the extension case 10. The extension case 10 includes an upper case 10a and a lower case 10b bolt-coupled to the upper case 10a. The mount case 11 is bolt-coupled to an upper end surface of the upper case 10a by a plurality of bolts $16_3$.

The casing 1 further includes annular lower distance members 13, an bearing bracket 14, and annular upper distance members 15, which are sequentially superimposed on the upper end of the mount case 11. The engine E is mounted to the upper distance member 15 with the crankshaft 17 being vertically arranged and the cylinder block 18 facing rearward. The bearing bracket 14 and upper distance member 15 are secured to the cylinder block 18 and a bottom wall of the crankcase 19 of the engine E by a plurality of bolts $16_1$. The lower distance member 13, the bearing bracket 14, and the upper distance member 15 are secured to one another by a plurality of bolts $16_2$.

As clearly shown in FIG. 2 and FIG. 3, a torque converter T is arranged in the annular upper distance member 15, and coaxially connected to a lower end of the crankshaft 17. The crankshaft 17 and the torque converter T are arranged above the swivel shaft 6.

An output shaft 20 is arranged in the extension case 10 so as to be offset by a certain distance e from the crankshaft 17 toward the cylinder block 18 so that the output shaft 20 is positioned in the rear of the swivel shaft 6. The mount case 11 has a dish-shape in which a transmission device 81 for providing a connection between the torque converter T and the output shaft 20 is arranged in the vicinity of a bottom wall of the mount case 11.

The gear case 12 horizontally supports the propeller shaft 3 having the propeller 2 at its rear end, and houses a forward-reverse shifting gear mechanism 21 connecting the output shaft 20 to the propeller shaft 3.

In operation of the engine E, the power thereof is transmitted from the crankshaft 17 to the output shaft 20 sequentially through the torque converter T and the transmission device 81, and further to the propeller shaft 3 through the forward-reverse shifting gear mechanism 21, thereby driving the propeller 2. The rotational direction of the propeller 2 is controlled and switched by the forward-reverse shifting gear mechanism 21.

As shown in FIG. 4, in the extension case 10, an oil tank 22 open to the mount case 11 is integrally formed with the upper case 10a of the extension case 10. The oil tank 22 stores oil 23 which is used in both lubrication of the engine E and operation of the torque converter T. A downstream end 90 of an exhaust gas passage of the engine E is integrally formed with the upper case 10a.

A drive plate 31 having a diameter larger than that of the torque converter T is secured to a lower end of the crankshaft 17 by a plurality of bolts 322.

The torque converter T includes a pump impeller 25, a turbine runner 26 arranged above the pump impeller 25 and opposed to the pump impeller 25, a stator 27 arranged between the inner peripheral portions of the pump impeller 25 and the turbine runner 26, and a circulation circuit 28 of working oil which is defined between these three impellers 25 to 27. The pump impeller 25 integrally includes a transmission cover 29 for covering an upper surface of the turbine runner 3. A ring gear 30 for starting operation is secured to an outer peripheral surface of the transmission cover 29. The ring gear 30 is secured to the drive plate 31 by a plurality of third bolts.

A cup-shaped supporting cylinder 34 is secured to a central part of the transmission cover 29. The supporting cylinder 34 is fitted into a supporting hole 33 which is open to the central part of the lower end surface of the crankshaft 17. A hub of the turbine runner 26 is spline-coupled to a turbine shaft 49 whose upper end extends to the inside of the supporting cylinder 34 and is supported in the supporting cylinder 34 via a bearing bush 35. A hollow stator shaft 37 is arranged around the outer periphery of the turbine shaft 49 so as to be supported by the turbine shaft 49 via a needle bearing 36. A known free wheel 38 is interposed between the stator shaft 37 and a hub of the stator 27. In this way, the torque converter T is coaxially connected to the crankshaft 17.

A hollow pump shaft 39 is arranged at the outer periphery of the stator shaft 37. The hollow pump shaft 39 is integrally coupled to the pump impeller 25 and extends downward. The pump shaft 39 is supported by the bearing bracket 14 via an upper ball bearing 43 on the side of the outer periphery. An oil pump 41 driven at the lower end portion of the pump shaft 39 is attached to a pump housing 40 formed at a lower surface of the bearing bracket 14. A pump cover 42 covering a lower surface of the oil pump 41 is bolt-coupled to a lower surface of the bearing bracket 14. An oil seal 45 is attached to an upper end portion of the bearing bracket 14 such that its lip is in close contact with an outer peripheral surface of the pump shaft 39 at a position immediately above the ball bearing 43.

The stator shaft 37 has a large diameter portion 37a at its lower end. A flange 37b is integrally formed on an outer periphery of the large diameter portion 37a. The flange 37b is secured to the pump cover 42 by a bolt 46. A lower ball bearing 44 is mounted to its inner periphery of the flange 37b so as to support the output shaft 20.

A thrust needle bearing 47 is interposed between the pump impeller 25 and the hub of the stator 27. A thrust needle bearing 48 is interposed between the hub of the turbine runner 26 and the transmission cover 29.

As clearly shown in FIG. 3, the transmission device 81 comprises a drive gear 81a and a follower gear 81b. The drive gear 81a is spline-fitted to the lower end of the crankshaft 17 and secured thereto by a nut 82. The follower gear 81b is arranged at a position offset by the certain distance e from an axis of the crankshaft 17 toward the cylinder block 18, and is engaged with the drive gear 81a. The follower gear 81b integrally has a hollow shaft portion 83 to which an upper end of the output shaft 20 is spline-fitted. An upper end of the shaft portion 83 is supported by the pump cover 42 via a ball bearing 84, and a lower end thereof is supported by the mount case 11 via a ball bearing 85. Further, as clearly shown in FIG. 4, the output shaft 20 is supported by a supporting sleeve 71 which is integrally formed outside of the oil tank 22 at a position immediately below the mount case 11.

The oil pump 41 draws up the oil stored in the oil tank 22, and supplies the oil to the engine E and the torque converter T. The route of the oil discharged by the oil pump 41 will be described below with reference to FIG. 5.

Figure 5:
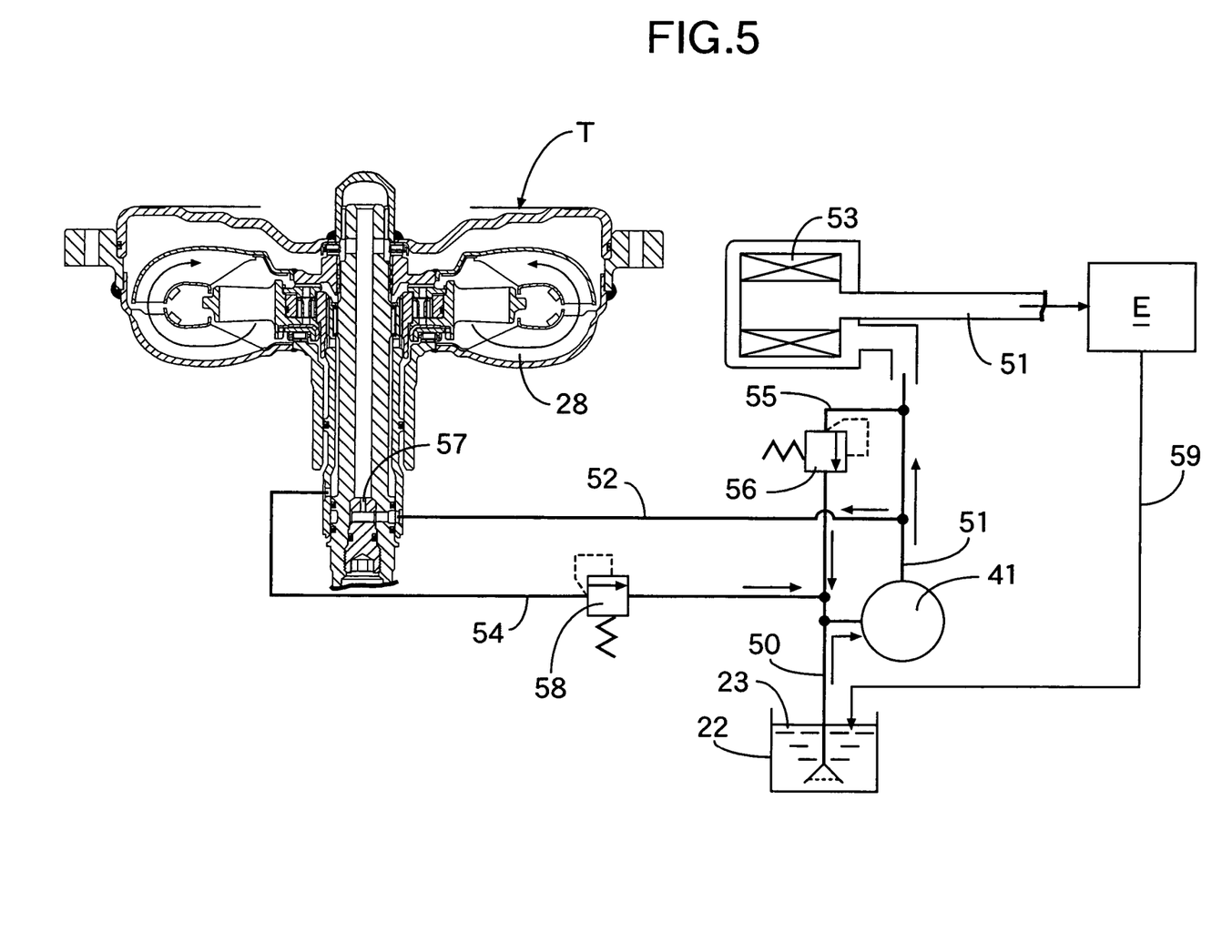
FIG. 5 is a view showing a hydraulic circuit including an oil pump.

The oil pump 41 draws up the oil 23 stored in the oil tank 22 via an oil suction passage 50, and discharges the oil 23 to a first oil supply passage 51. The oil discharged to first oil supply passage 51 is filtered by an oil filter 53 provided in the middle of the first oil supply passage 51, and supplied to a lubricated portion of the engine E. After the lubrication, the oil flows downward to the bottom portion of the crankcase 19 of the engine E, and returns to the oil tank 22 via the first oil return passage 59.

The oil discharged to the first oil supply passage 51 is also supplied to a circulation circuit 28 of the torque converter T via a second oil supply passage 52 which is a branch from the first oil supply passage 51 upstream of the oil filter 53. After being used in the circulation circuit 28, the oil is returned to the oil suction passage 50 or the oil tank 22 via a second oil return passage 54.

An oil relief passage 55 is another branch from the first oil supply passage 51 upstream of the oil filter 53, and reaches the oil suction passage 50. The oil relief passage 55 has a pressure relief valve 56 which opens when an oil pressure of the first oil supply passage 51 exceeds a specified value.

The second oil supply passage 52 has an orifice 57 for controlling the amount of the oil supplied to the circulation circuit 28 of the torque converter T. The second oil return passage 54 also has a normally-closed pressure response valve 58 which opens when an oil pressure upstream of the second oil return passage 54 exceeds a predetermined value.

Thus, when the pressure of the first oil supply passage 51 is regulated by the single pressure relief valve 56, the pressure of the second oil supply passage 52 is concurrently regulated, whereby the pressure of the circulation circuit 28 in the torque converter T is regulated, and the transmission characteristics of the torque converter T can be stabilized. In addition, the downstream end of the oil relief passage 55 is connected to the oil suction passage 50, whereby the oil released from the oil relief passage 55 is smoothly returned to the oil pump 41, thereby simplifying the oil pressure circuit.

Referring again to FIG. 2 and FIG. 3, the oil suction passage 50 is suspended from the bearing bracket 14, and includes a suction tube 50a having a lower end portion extending into the oil tank 22, and a lateral oil passage 50b which is provided in the bearing bracket 14 so as to communicate the upper end portion of the suction tube 50a with a suction port 41a of the oil pump 41.

The second oil supply passage 52 includes a bottomed vertical hole 52b which is provided at a central portion of the output shaft 20 so as to open in the upper end surface of the output shaft 20, an inlet oil passage 52a which is provided to pass through the fitted portions between the pump cover 42, the stator shaft 37 and the turbine shaft 49 so as to communicate a discharge port 41b of the oil pump 41 with the lower portion of the vertical hole 52b, and a horizontal hole 52c which is provided at an upper part of the vertical hole 52b so as to pass through the peripheral portion of the thrust needle bearing 48 into the transmission cover 29. The interior of the transmission cover 29 communicates with an outer peripheral portion of the circulation circuit 28.

The second oil return passage 54 includes a cylindrical oil passage 54a which is defined between the turbine shaft 49 and the stator shaft 37 and is in communication with the circulation circuit 28 through the peripheral portion of the thrust needle bearing 47 above the hub of the pump impeller 25, and a lateral outlet oil passage 54b which is provided at the pump cover 42 to communicate with the lower end portion of the cylindrical oil passage 54a. The outlet oil passage 54b is in communication with the lateral oil passage 50b via the pressure response valve 58.

The pressure response valve 58 includes a cylindrical valve chamber 60 horizontally provided in the pump cover 42, and a piston-type valve body 61 slidably fitted in the valve chamber 60. The outlet oil passage 54b is open to the inner end surface of the valve chamber 60. A valve hole 62 is open in the inner side surface of the valve chamber 60 so as to communicate with the lateral oil passage 50b or the oil tank 22. The valve body 61 is arranged so that its top surface, that is, pressure receiving surface is directed toward the outlet oil passage 54b. The valve hole 62 is closed when the valve body 61 is advanced toward the outlet oil passage 54b, and is opened when the valve body 61 is retracted. A valve spring 63 is arranged between the rear surface of the valve body 61 and the screw plug 64 screwed into the opening of the valve chamber 60 so as to urge the valve body 61 to the advancing direction, that is, to the valve closing direction. Therefore, the valve body 61 is normally held at its closed position by a set load of the valve spring 63 to thereby block the second oil return passage 54. When an oil pressure is generated upstream of the second oil return passage 54 and exceeds a predetermined value, the top surface of the valve body 61 receives the oil pressure, and the valve body 61 is caused to retract against the set load of the valve spring 63 to be opened, whereby the second oil return passage 54 enters a communicated state.

An opening 66 (see FIG. 2) is provided in a bottom wall of the crankcase 19 of the engine E. The oil having completed the lubrication of the engine E is discharged through the opening 66 into the oil reservoir case 24. A series of vertical through holes 67 are formed in outer peripheral portions of the upper distance member 15 and the bearing bracket 14. The through holes 67 cause the interior of the oil reservoir case 24 to be opened into the mount case 11. The mount case 11 has an opening 68 which is open to the oil tank 22. Therefore, the oil which resides on the bottom portion of the crankcase 19 after completing the lubrication of the engine E, first moves from the opening 66 into the oil reservoir case 24 to lubricate the transmission device 81, and then returns to the oil tank 22 via the through holes 67 and the opening 68. The opening 66, the through holes 67, and the opening 68 form the first oil return passage 59.

In FIG. 3, a first seal member $70_1$ is attached to the outer periphery of the stator shaft 37 so as to closely contacts the inner peripheral surface of the pump shaft 39 in a relatively rotatable manner, thereby preventing the oil in the torque converter T from flowing downward of the pump shaft 39.

A second seal member $70_2$ is provided between the stator shaft 37 and the pump cover 42 at a position below the inlet oil passage 52a, thereby preventing the oil in the inlet oil passage 52a from flowing downward of the stator shaft 37 and the pump cover 42.

Third and fourth seal members $70_3$ and $70_4$ are provided around the outer periphery of the turbine shaft 49 in the fitted portions of the turbine shaft 49 and the stator shaft 37 such that they are arranged in the vertical direction to closely contact from above and below the inner peripheral surface of the stator shaft 37 in a relatively rotatable manner. The third and fourth seal members $70_3$ and $70_4$ cooperate to prevent the oil in the inlet oil passage 52a from flowing out of the fitted portions of the output shaft 20 and the stator shaft 37. Further, the upper seal member $70_3$ prevents the oil in the inlet oil passage 54a from flowing downward to the fitted portions of the turbine shaft 49 and the stator shaft 37.

The turbine shaft 49 has a flange 73 which abuts on the upper end surface of an inner lace of the ball bearing 44 attached to the inner periphery of the large diameter portion 37a of the stator shaft 37. A stopper collar 74 is locked to the inner peripheral surface of the large diameter portion 37a so as to support the lower end surface of an outer lace of the ball bearing 44. Therefore, unless the stopper collar 74 is removed, the upper output shaft 20a cannot be pulled out downward from the central portion of the torque converter T.

Besides the vertical hole 52b, the turbine shaft 49 has a plug hole 76 connected to the lower end of the vertical hole 52b and open in the lower end of the turbine shaft 49. A plug 78 is screwed into the plug hole 76 to form the bottom wall of the vertical hole 52b. The plug 78 has a part of the inlet oil passage 52a, and the orifice 57 for communicating the inlet oil passage 52a with the vertical hole 52b. A fifth seal member 70s is attached to the plug 78 to closely contact the inner peripheral surface of the plug hole 76.

The inlet oil passage 52a may be formed to bypass the plug 78.

Now, operation of the first embodiment will be described below.

In operation of the engine E, its power is transmitted from the crankshaft 17 through the drive gear 81a to the pump impeller 25, thereby driving the pump impeller 25, and also driving the oil pump 41 through the pump shaft 39. The thus-driven oil pump 41 draws up the oil 23 in the oil tank 22 through the oil suction passage 50, that is, through the suction tube 50a and the lateral oil passage 50b, and discharges the drawn-up oil 23 to the first oil supply passage 51 and the second oil supply passage 52. The oil discharged to the first oil supply passage 51 is supplied to the lubricated portion of the engine E, as described above.

Meanwhile, the oil supplied to the second oil supply passage 52 sequentially passes through the inlet oil passage 52a and the orifice 57; ascend through the vertical hole 52b of the turbine shaft 49 to go out of the horizontal hole 52c; enters the transmission cover 29 while lubricating the thrust needle bearing 48; and then flows into circulation circuit 28 from the outer peripheral side of the turbine runner 26.

The pump impeller 25 driven by the drive plate 31 causes the oil in the circulation circuit 28 to circulate, as shown by the arrows, thereby transmitting the rotational torque of the pump impeller 25 from the turbine runner 26 to the turbine shaft 49, further through the drive gear 81a and the follower gear 81b to the output shaft 20, still further through the forward-reverse shifting gear mechanism 21 to the propeller shaft 3, thereby driving the propeller 2. At this time, if the torque is amplified between the pump impeller 25 and the turbine runner 26, the reaction force due to the amplification is borne by the stator 27, which is fixed there by the locking operation of the free wheel 38. Such a torque amplifying effect of the torque converter T strongly drives the propeller 2, thereby effectively improving start and acceleration of a ship.

After the amplification, the stator 27 rotates in the same direction together with the pump impeller 25 and the turbine runner 26 due to the reversal in direction of the torque which the stator 27 receives, while causing the freewheel 38 to run idle.

After being used at the circulation circuit 28, the oil runs down the cylindrical oil passage 54a while lubricating the thrust needle bearing 47 above the hub of the pump impeller 25, and enters the valve chamber of the pressure response valve 58 from the outlet oil passage 54b.

The oil having entered the valve chamber 60 exerts a pressure to press the valve body 61 of the pressure response valve 58 against the set load of the valve spring 63, whereby the valve body 61 is opened to open the valve hole 62, so that the oil returns from the valve chamber 60 through the valve hole 62 into the oil suction passage 50 or the oil tank 22. In this way, the oil circulates between the circulation circuit 28 of the torque converter T and the oil tank 22 arranged below the torque converter T through the second oil supply passage 52 and the second oil return passage 54. Therefore, it is possible to downsize the torque converter T, and promote the cooling of the circulating oil to prevent degradation of the oil.

In particular, since the oil tank 22 arranged below the torque converter T is separated from the engine E, the oil tank 22 is not much heated by the engine E, the oil tank 22 can have a relatively large capacity without any interference by the engine E and the torque converter T, and thus can increase the amount of oil flowing into the circulation circuit 28, thereby further promoting the cooling of the circulating oil. Further, the engine E, the torque converter T, and the oil tank 22 are sequentially arranged from top to bottom, thereby downsizing the outboard engine system O including these components.

Further, because the crankshaft 17 and the torque converter T having a relatively heavy weight are arranged above the swivel shaft 6, the centers of gravity of the engine E and the torque converter T can be close to the swivel shaft 6. Therefore, it is possible to reduce the bending moment of the swivel shaft 6 due to the weight of the engine E and the torque converter T, thereby providing a smooth steering of the outboard engine system O about the swivel shaft 6.

Because the torque converter T and the output shaft 20 which are arranged offset from each other are connected to each other via the transmission device 81, the power transmission from the torque converter T to the output shaft 20 can be performed without any problem.

Meanwhile, the oil having completed the lubrication of the respective portions of the engine E flows down to the bottom of the crank case 19, goes from the opening 66 through the through holes 67 down to the bottom of the mount case 11, that is, the oil reservoir 24, thereby lubricating the transmission device 81 arranged closed to the bottom of the mount case 11. Therefore, the mount case 11 mounting the engine E also serves as the oil reservoir 24 for lubrication of the transmission device 81, thereby simplifying the structure and improving the durability of the transmission device 81.

The oil having lubricated the transmission device 81 immediately returns from the opening 68 of the mount case 11 to the oil tank 22. Therefore, the amount of oil residing in the oil reservoir 24 is small, thereby suppressing the agitation of the oil due to the transmission device 81 to minimize the power loss.

The through holes 67 for guiding the oil flowing down to the bottom of the crank case 19 to the oil reservoir 24 is provided apart from the torque converter T toward the outer periphery. Therefore, it is possible to prevent the lubrication oil from contacting the outer peripheral surface of the torque converter T, thereby avoiding needless agitation and splash of the oil to minimize the power loss.

The oil discharged from the oil pump 41 for lubricating the engine E is also supplied to the circulation circuit 28, which eliminates any addition/expansion of the oil tank 22 and the oil pump 41 for supplying the oil to the circulation circuit 28, thereby avoiding an increase of size and complication of the outboard engine system O.

If the gear case 12 is separated from the extension case 10 for maintenance of the forward-reverse shifting gear mechanism 21 for example, the output shaft 20 can be separated downward together with the gear case 12 while the torque converter T is remained on the mount case 11 together with the engine E, by pulling the output shaft 20 out of the follower gear 81b of the transmission device 81. This arrangement facilitates the maintenance of the forward-reverse shifting gear mechanism 21, and thus re-assembling of the gear case 12 can be easily performed.

The same is true in the case where the engine E and the torque converter T are removed from the mount case 11, which facilitates maintenance of these components.

The oil pump 41 is attached to the pump housing 40 formed on the lower surface of the bearing bracket 14 and holds the pump cover 42. Therefore, the bearing bracket 14 supports not only the torque converter T but also the oil pump 41, thereby simplifying the support structure of the oil pump 41.

When the operation of the engine E is terminated, also the operation of the oil pump 41 is terminated, so that in the pressure response valve 58, the pressure of the valve chamber 60 is decreased and the valve body 61 is closed by the set load of the valve spring 63. This causes the outlet oil passage 54b to enter the blocked state, and prevents the oil from flowing from the circulation circuit 28 of the torque converter T into the oil tank 22, thereby keeping the circulation circuit 28 filled with the oil. Therefore, it is possible to enhance the responsiveness of operation of the torque converter T.

Because a part of the second oil supply passage 52 is the vertical hole 52b which is formed at the central portion of the turbine shaft 49 and whose upper end communicates with the circulation circuit 28, the structure of the second oil supply passage 52 can be simplified. Further, when the engine E is not operated, the vertical hole 52b prevents the oil from flowing back from the circulation circuit 28 into the oil pump 41.

The present invention is not limited to the above described embodiment, and various modifications in design can be made without departing from the subject matter of the present invention. For example, the oil tank 22 may be divided into a section for storing working oil for the torque converter T and a section for storing lubrication oil for the engine E, and oil suitable for each purpose is stored in each section.

What is claimed is:

1. An outboard engine system comprising:
    a casing coupled to a swivel case via a swivel shaft
    an engine mounted in an upper part of the casing such that a crankshaft of the engine is vertically arranged and a cylinder block of the engine faces in a direction opposite to the swivel shaft;
    a torque converter;
    a vertically arranged output shaft connected to the crankshaft through the torque converter;
    a horizontally arranged propeller shaft provided below the output shaft; and
    a forward-reverse shifting gear mechanism for providing a connection between the output shaft and the propeller shaft;
    the torque converter, the output shaft, the propeller shaft and the forward-reverse shifting gear mechanism being disposed in the casing,
    wherein the crankshaft and the torque converter which is coaxially connected to a lower end of the crankshaft are disposed above the swivel shaft; and the torque converter and the output shaft which is disposed behind the swivel shaft are connected to each other via a transmission device and
    wherein the engine is mounted in a mount case which constitutes a part of the casing; the transmission device is disposed close to a bottom portion of the mount case; and the bottom portion of the mount case comprises an oil reservoir which receives a lubrication oil flowing down from the engine for lubricating the transmission device.

2. The outboard engine system according to claim 1, further comprising: a bulkhead member which is connected to an upper end of the mount case so as to provide a partition between the torque converter and the transmission device; and a through hole is provided in the bulkhead member so as to guide lubrication oil flowing down from the engine to the oil reservoir.

* * * * *